United States Patent
Lee et al.

(10) Patent No.: US 8,391,365 B2
(45) Date of Patent: Mar. 5, 2013

(54) MOTION ESTIMATOR AND A MOTION ESTIMATION METHOD

(75) Inventors: Gwo-Giun Lee, Taipei (TW); He-Yuan Lin, Kaohsiung County (TW); Ming-Jiun Wang, Chiayi County (TW)

(73) Assignee: National Cheng Kung University, Tainan (TW)

( * ) Notice: Subject to any disclaimer, the term of this patent is extended or adjusted under 35 U.S.C. 154(b) by 682 days.

(21) Appl. No.: 12/408,467

(22) Filed: Mar. 20, 2009

(65) Prior Publication Data

US 2010/0239017 A1    Sep. 23, 2010

(51) Int. Cl.
    *H04N 11/04* (2006.01)
(52) U.S. Cl. .................................. 375/240.16
(58) Field of Classification Search .................. 348/699; 375/240.12, 240.16, 240.19; 382/107
    See application file for complete search history.

(56) References Cited

U.S. PATENT DOCUMENTS

| | | | |
|---|---|---|---|
| 2005/0265454 A1* | 12/2005 | Muthukrishnan et al. | 375/240.16 |
| 2007/0076796 A1* | 4/2007 | Shi et al. | 375/240.16 |
| 2009/0207915 A1* | 8/2009 | Yan et al. | 375/240.16 |
| 2011/0135003 A1* | 6/2011 | Zhang | 375/240.16 |

OTHER PUBLICATIONS

Lee et al. "Dynamic Search-Window Adjustment and Interlaced Search for Block-Matching Algorithm", Feb. 1993, IEEE Transactions on Circuits and Systems for Video Technology, vol. 3, No. 1.*

* cited by examiner

*Primary Examiner* — Thai Tran
*Assistant Examiner* — Stephen Smith
(74) *Attorney, Agent, or Firm* — Osha Liang LLP (57) ABSTRACT

A motion estimation method includes: (A) defining one pixel in a reference image as a center of search (CS) corresponding to a target pixel set in a current image; (B) determining a center error (CE) signal; (C) defining another pixel in the reference image as a target of search (TS) with reference to the CS, one candidate search vector available for selection from a vector set, and a step size; (D) determining a target error (TE) signal; (E) determining whether to update the CS and the CE signal; (F) if determined, updating the CS, the CE signal and the vector set; (G) repeating steps (C)~(F) using a candidate search vector selected from the vector set and the same step size until there is no candidate search vector available for selection in the vector set; (H) repeating steps (C)~(G) using a smaller step size until a predetermined value is reached; and (I) computing a motion vector based on the target pixel set and one pixel set that includes the CS.

18 Claims, 4 Drawing Sheets

FIG. 1
PRIOR ART

○ pixels used for calculating offset values in step 1
● pixels used for calculating offset values in step 2
△ pixels used for calculating offset values in step 3

K: center of search
E: target of search obtained from candidate search vector (0, 1) and a step size of 1
F: target of search obtained from candidate search vector (1, 0) and a step size of 1
G: target of search obtained from candidate search vector (0, -1) and a step size of 1
H: target of search obtained from candidate search vector (-1, 0) and a step size of 1

FIG. 4

MOTION ESTIMATOR AND A MOTION ESTIMATION METHOD

BACKGROUND OF THE INVENTION

1. Field of the Invention

The invention relates to motion estimation technology, more particularly to a motion estimator and a method implemented thereby for estimating motion vector of a video.

2. Description of the Related Art

In order to increase the efficiency of video compression in video encoders, it is general practice that not every pixel in every full image is encoded. Rather, pixel variations in different images are recorded using motion vectors, which are subsequently used for reconstruction back into the full images.

As the video sequence changes in motion, the pixels in the images change as well. In other words, the pixel on row (p), column (q) (also referred to as the pixel (p, q)) in a current image might originate from the pixel (g, h) in a previous image, for example. Generally speaking, a pixel set containing at least one pixel is used in the process of motion estimation. Therefore, in order to locate the most probable source of estimation (e.g., the pixel set that includes the pixel (g, h)), a conventional three-step search method including the following three steps is used. It should be noted herein that in the following description, it is assumed that the pixel (a, b) in the previous image is defined as an initial center of search.

In the following description, for a particular pixel set size, a pixel set (a, b) refers to the set of pixels within an area of the pixel set size where the pixel (a, b) serves as a reference pixel.

Figure 1:
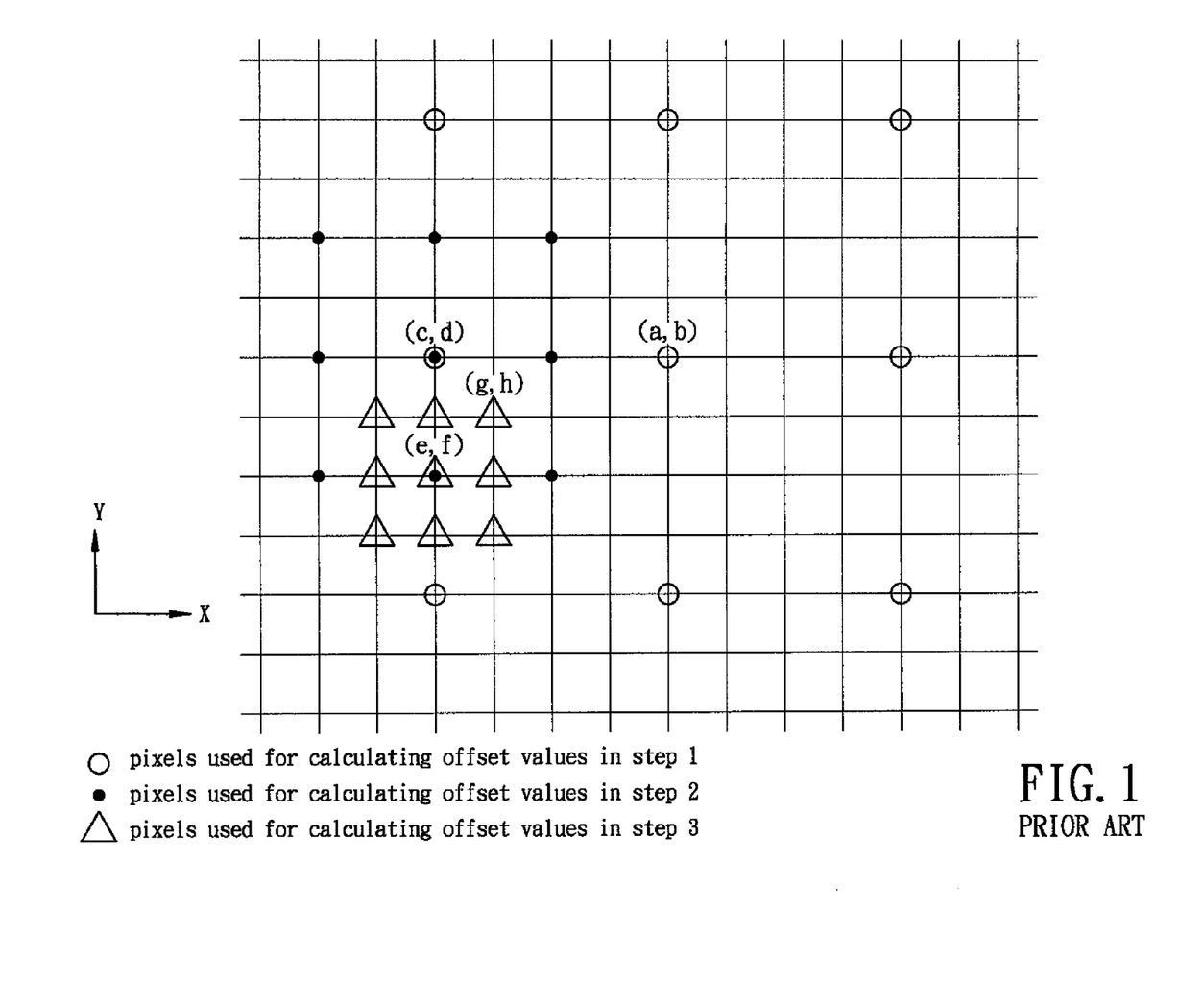
FIG. 1 is a schematic diagram, illustrating a conventional three-step search method.

In step 1, with reference to FIG. 1, for each of pixel sets (a±4, b), (a, b±4) and (a±4, b±4) in the previous image, a matching error with respect to the pixel set (p, q) in the current image is calculated. A pixel set (c, d) in the previous image resulting in the least matching error is located, and is taken as an updated center of search. In the example shown in FIG. 1, the pixel set (c, d) resulting in the least matching error is the pixel set (a−4, b). In particular, the matching error is calculated according to the pixels in each of the pixel sets (a±4, b), (a, b±4) and (a±4, b±4) in the previous image and the pixel set (p, q) in the current image.

In step 2, for each of pixel sets (c±2, d), (c, d±2) and (c±2, d±2) in the previous image, a matching error with respect to the pixel set (p, q) in the current image is calculated. A pixel set (e, f) in the previous image resulting in the least matching error is located, and is taken as an updated center of search. In the example shown in FIG. 1, the pixel set (e, f) resulting in the least matching error is the pixel set (c, b−2).

In step 3, for each of pixel sets (e±1, f), (e, f±1) and (e±1, f±1) in the previous image, a matching error with respect to the pixel set (p, q) in the current image is calculated. A pixel set (g, h) in the previous image resulting in the least matching error is located, and is taken as the most probable source pixel set. The vector between the pixel set (g, h) and the pixel set (p, q) is the motion vector. In the example shown in FIG. 1, the pixel set (g, h) resulting in the least matching error is the pixel set (e+1, f+1).

However, although the conventional three-step search method is capable of locating the most probable source of estimation, a significant amount of computations is required for calculating the matching errors. In addition, the amount of computations increases as image resolution and range of search increase, thereby resulting in a high manufacturing cost for motion estimators.

SUMMARY OF THE INVENTION

Therefore, the object of the present invention is to provide a motion estimation method and a motion estimator for implementing the same involving a reduced amount of computations and incurring a reduced manufacturing cost as compared to the prior art.

According to one aspect of the present invention, there is provided a motion estimation method for analyzing motion of a target pixel set in a current image with respect to a reference image. Each of the current image and the reference image includes a plurality of pixel sets. The target pixel set is one of the plurality of pixel sets in the current image. Each of the pixel sets includes at least one pixel. The motion estimation method includes the machine-implemented steps of:

(A) defining one of the pixels in one of the pixel sets in the reference image as a center of search corresponding to the target pixel set;

(B) determining a center error signal based on the target pixel set in the current image and said one of the pixel sets in the reference image that includes the center of search defined in step (A);

(C) defining another one of the pixel sets in the reference image as a target of search with reference to the center of search, a candidate search vector selected from a set of candidate search vectors available for selection, and a step size;

(D) determining a target error signal based on the target pixel set in the current image and one of the pixel sets in the reference image that includes the target of search;

(E) determining whether or not to update the center of search and the center error signal based on a comparison result between the center error signal and the target error signal;

(F) when it is determined in step (E) that the center of search and the center error signal are to be updated, updating the center of search and the center error signal, and updating the set of candidate search vectors available for selection with the step size used in step (C) by removing one of the candidate search vectors that is opposite to the selected candidate search vector from the set if said one of the candidate search vectors that is opposite to the selected candidate search vector is present in the set;

(G) repeating steps (C) to (F) by selecting one of the candidate search vectors available for selection from the set, which is possibly the same as the previous one, and the same step size until there is no candidate search vector available for selection in the set;

(H) repeating steps (C) to (G) using a smaller step size until the value of the step size reaches a predetermined value; and (I) computing a motion vector based on the target pixel set in the current image and one of the pixel sets in the reference image that includes the center of search.

According to another aspect of the present invention, there is provided a motion estimator for analyzing motion of a target pixel set in a current image with respect to a reference image. Each of the current image and the reference image includes a plurality of pixel sets. The target pixel set is one of the plurality of pixel sets in the current image. Each of the pixel sets includes at least one pixel. The motion estimator includes a step size controller, a determining unit and a computing unit. The step size controller provides a step size. The determining unit is coupled electrically to the step size controller for receiving the step size therefrom, defines one of the pixels in one of the pixel sets in the reference image as a center of search corresponding to the target pixel set, selects a candidate search vector from a set of candidate search vectors available for selection, and further defines another one of the pixels in the reference image as a target of search with reference to the center of search, the selected candidate search vector, and the step size received from the step size controller.

The computing unit is coupled electrically to the determining unit for receiving the center of search and the target of search therefrom, determines a center error signal based on the target pixel set in the current image and said one of the pixel sets in the reference image that includes the center of search, further determines a target error signal based on the target pixel set in the current image and one of the pixel sets in the reference image that includes the target of search, and transmits the center error signal and the target error signal to the determining unit.

The determining unit determines whether or not to update the center of search and the center error signal based on a comparison result between the center error signal and the target error signal, and updates the center of search and the center error signal and further updates the set of candidate search vectors available for selection with the same step size by removing one of the candidate search vectors that is opposite to the selected candidate search vector from the set when it is determined that the center of search and the center error signal are to be updated and that said one of the candidate search vectors that is opposite to the selected candidate search vector is present in the set.

The determining unit and the computing unit are operable to repeatedly select one of the candidate search vectors available for selection from the set, define another one of the pixels in the reference image as the target of search, determine the target error signal, determine whether or not to update the center of search and the center error signal, and update the center of search and the center error signal when it is determined that the center of search and the center error signal are to be updated until there is no candidate search vector available for selection in the set.

The step size controller, the determining unit and the computing unit are operable to repeatedly provide a smaller step size, select one of the candidate search vectors available for selection, define another one of the pixels in the reference image as the target of search, determine the target error signal, determine whether or not to update the center of search and the center error signal, and update the center of search and the center error signal when it is determined that the center of search and the center error signal are to be updated until the value of the step size reaches a predetermined value.

The determining unit computes a motion vector based on the target pixel set in the current image and one of the pixel sets in the reference image that includes the center of search when the value of the step size reaches the predetermined value.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

In approaching the most probable source pixel set in the reference image for computing the motion vector for the target pixel set in the current image, the motion estimation method of the present invention first selects a pixel in the reference image proximate to the center of search as the target of search, compares the target error signal and the center error signal respectively corresponding to the target of search and the center of search, updates the center of search when it is determined that the target of search is more probable than the center of search, and reiterates until a predefined condition is met (e.g., the predetermined value is reached by the step size).

Figure 2:
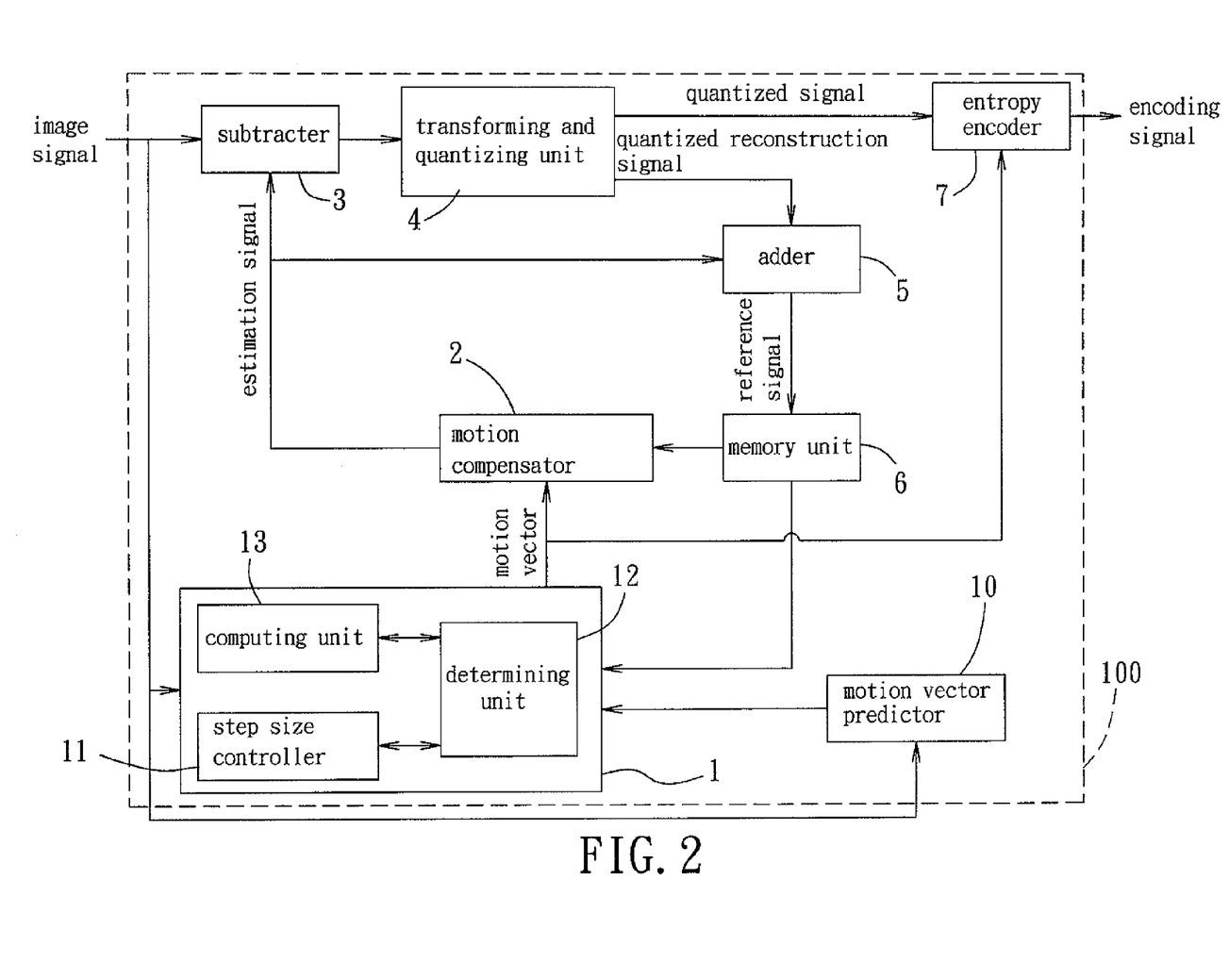
FIG. 2 is a block diagram of the preferred embodiment of a motion estimator according to the present invention.

With reference to FIG. 2, the preferred embodiment of a motion estimator 1 according to the present invention is adapted for use in a video encoder 100 that is adapted for receiving a video signal. The video signal includes a plurality of images. Each of the images includes a plurality of pixel sets, each of which includes at least one pixel. The motion estimator 1 is used to analyze motion of a target pixel set in a current image with respect to a reference image. The target pixel set is one of the pixel sets in the current image.

In addition to the motion estimator 1, the video encoder 100 further includes a motion vector predictor 10, a motion compensator 2, a subtracter 3, a transforming and quantizing unit 4, an adder 5, a memory unit 6, and an entropy encoder 7.

In the video encoder 100, the subtracter 3 computes a difference between the video signal and an estimation signal. The transforming and quantizing unit 4 is coupled electrically to the subtracter 3 for transforming the difference computed by the subtracter 3 from the time domain into the frequency domain, and determines a quantization scale based on the distribution of the difference in the frequency domain so as to generate a quantized signal. The transforming and quantizing unit 4 further generates a quantized reconstruction signal. The adder 5 is coupled electrically to the transforming and quantizing unit 4 for adding the estimation signal and the quantized reconstruction signal so as to generate a reference signal to be subsequently supplied to the memory unit 6 for storage therein. Since the reference signal is generated from the video signal, the reference signal also includes a plurality of images, each of which includes a plurality of pixel sets, and each of the pixel sets includes at least one pixel.

The motion vector predictor 10 is adapted for receiving the image signal, and generates, for the target pixel set in the current image, an estimated origin in the reference image to be supplied to the motion estimator 1. It should be noted herein that since the feature of the present invention does not reside in the motion vector predictor 10, further details of the same are omitted herein for the sake of brevity.

In this embodiment, the motion estimator 1 is adapted for receiving the video signal, and is coupled electrically to the memory unit 6 for receiving the reference signal therefrom. The motion estimator 1 is further coupled electrically to the motion compensator 2 and the motion vector predictor 10. The motion estimator 1 takes one of the images of the video signal as the current image, and takes one of the images in the reference signal as the reference image. However, it should be noted herein that the reference image may also be any of the images preceding or succeeding the current image in other embodiments of the present invention. The motion estimator 1 analyzes the current image and the reference image for relative motion therebetween in order to determine a most probable source pixel set for the target pixel set so as to estimate and generate a motion vector to be supplied to the motion compensator 2. The motion compensator 2 subsequently generates the estimation signal with reference to the motion vector received from the motion estimator 1 and the reference signal received from the memory unit 6. The entropy encoder 7 is coupled electrically to the motion estimator 1 for receiving the motion vector therefrom, and generates an encoding signal with reference to the quantized signal and the motion vector as an output of the video encoder 100.

With reference to FIG. 2, the motion estimator 1 includes a step size controller 11, a determining unit 12, and a computing unit 13.

The step size controller 11 provides a step size (S).

The determining unit 12 is coupled electrically to the step size controller 11 for receiving the step size (S) therefrom, defines one of the pixels in one of the pixel sets in the reference image as a center of search (CTRx, CTRy) corresponding to the target pixel set, selects a candidate search vector (Dx, Dy) from a set of candidate search vectors (Dx, Dy) available for selection, and further defines another one of the pixels in the reference image as a target of search with reference to the center of search (CTRx, CTRy), the selected candidate search vector (Dx, Dy), and the step size (S) received from the step size controller 11.

The computing unit 13 is coupled electrically to the determining unit 12 for receiving the center of search (CTRx, CTRy) and the target of search therefrom, determines a center error signal based on the target pixel set in the current image and said one of the pixel sets in the reference image that includes the center of search (CTRx, CTRy), further determines a target error signal based on the target pixel set in the current image and one of the pixel sets in the reference image that includes the target of search, and transmits the center error signal and the target error signal to the determining unit 12.

The determining unit 12 further determines whether or not to update the center of search (CTRx, CTRy) and the center error signal based on a comparison result between the center error signal and the target error signal, and updates the center of search (CTRx, CTRy) and the center error signal when it is determined that the center of search (CTRx, CTRy) and the center error signal are to be updated.

The determining unit 12 and the computing unit 13 are operable to repeatedly select one of the candidate search vectors (Dx, Dy) available for selection from the set, define another one of the pixels in the reference image as the target of search, determine the target error signal, determine whether or not to update the center of search (CTRx, CTRy) and the center error signal, and update the center of search (CTRx, CTRy) and the center error signal and updates the set of candidate search vectors available for selection with the same step size by removing one of the candidate search vectors that is opposite to the selected candidate search vector from the set when it is determined that the center of search (CTRx, CTRy) and the center error signal are to be updated and that said one of the candidate search vectors that is opposite to the selected candidate search vector is present in the set, until there is no candidate search vector (Dx, Dy) available for selection in the set.

The step size controller 11, the determining unit 12 and the computing unit 13 are operable to repeatedly provide a smaller step size, select one of the candidate search vectors (Dx, Dy) available for selection, define another one of the pixels in the reference image as the target of search, determine the target error signal, determine whether or not to update the center of search (CTRx, CTRy) and the center error signal, and update the center of search (CTRx, CTRy) and the center error signal when it is determined that the center of search (CTRx, CTRy) and the center error signal are to be updated until the value of the step size (S) reaches a predetermined value.

The determining unit 13 computes the motion vector based on the target pixel set in the current image and one of the pixel sets in the reference image that includes the center of search (CTRx, CTRy) when the value of the step size (S) reaches the predetermined value.

Figure 3:
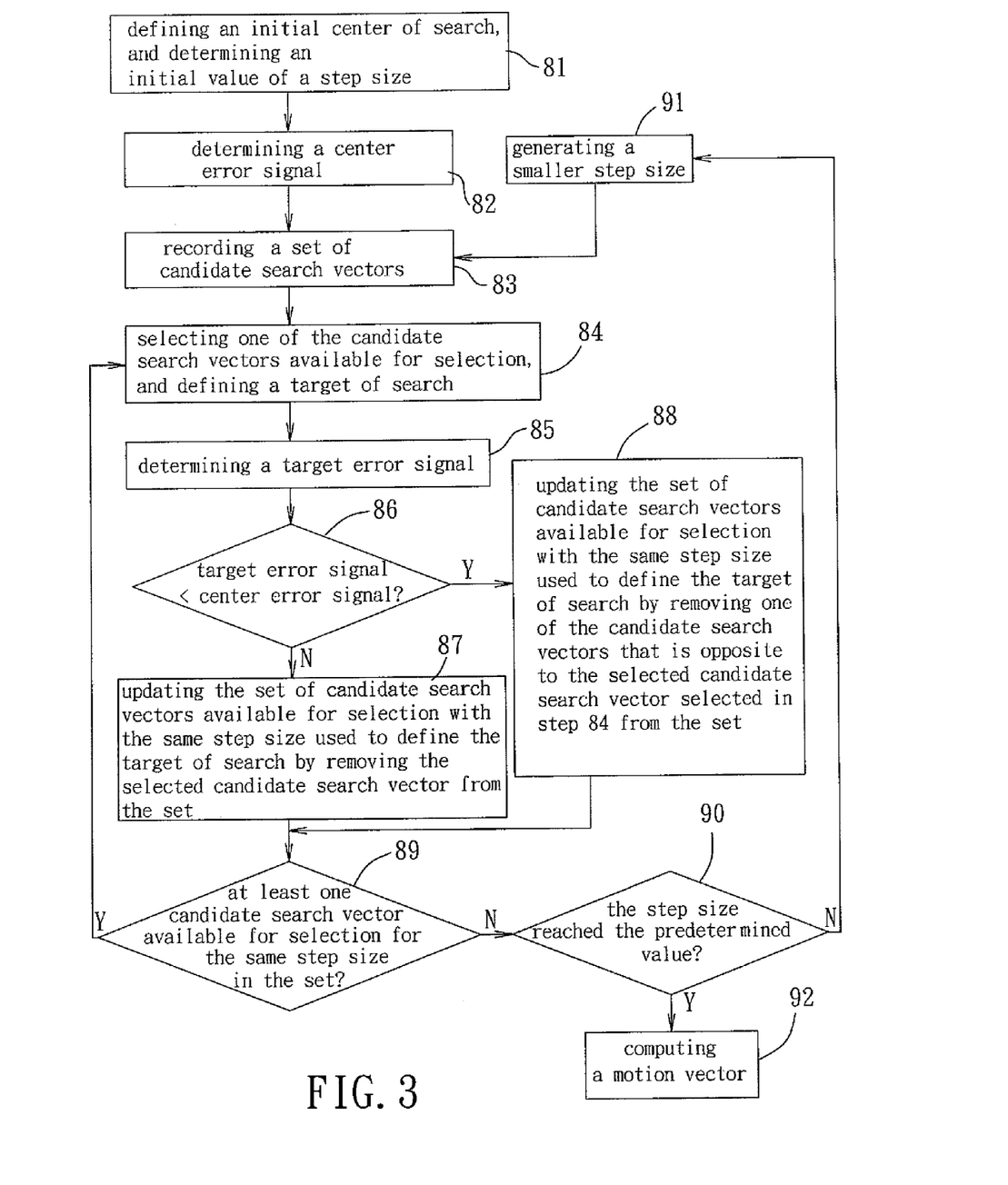
FIG. 3 is a flow chart, illustrating a motion estimation method according to the preferred embodiment of the present invention.

With reference to FIG. 3, the motion estimator 1 of the present invention is better described with reference to the motion estimation method carried out thereby.

For simplification of illustration, it is assumed that the target pixel set in the current image includes the pixel (P, Q), and the motion vector predictor 10 predicts that the pixel (P, Q) originates from the pixel (A, B).

Accordingly, in step 81, the determining unit 12 of the motion estimator 1 defines the pixel (A, B) in the reference image as the initial center of search (CTRx, CTRy) corresponding to the target pixel set, and the step size controller 11 determines an initial value of the step size (S) based on a resolution of the reference image, which is reflected by a total number of the pixels in the reference image.

In step 82, the computing unit 13 determines the center error signal based on the target pixel set in the current image and said one of the pixel sets in the reference image that includes the center of search (CTRx, CTRy) defined in step 81.

For example, the target pixel set may be a 16 by 16 pixel set, i.e., the target pixel set has 16×16 pixels in total. The pixel (P, Q) is located at the left upper corner in the target pixel set. Correspondingly, the pixel (A, B) is located at the left upper corner in said one of the pixel sets in the reference image.

In particular, the computing unit 13 determines the center error signal with reference to computed differences between the pixels in the target pixel set in the current image (e.g., the pixel (P, Q) and adjacent pixels that cooperate to form the 16 by 16 target pixel set) and corresponding pixels in said one of the pixel sets in the reference image that includes the center of search (CTRx, CTRy) (e.g., the pixel (A, B) and adjacent pixels that cooperate to form said one of the 16 by 16 pixel sets). In this embodiment, the sum of absolute differences (SAD) is used to determine the center error signal. However, other computation schemes may also be used as long as the difference between the target pixel set in the current image and said one of the pixels sets in the reference image can be reflected.

In step 83, the determining unit 12 records a set of candidate search vectors (Dx, Dy) in a list. In this embodiment, there are a total of four candidate search vectors (Dx, Dy), namely (1, 0), (−1, 0), (0, 1), (0, −1). By default, all of the four candidate search vectors (Dx, Dy) are available for selection.

In step 84, the determining unit 12 selects one of the candidate search vectors (Dx, Dy) available for selection, and defines another one of the pixels in the reference image as the target of search with reference to the center of search (CTRx, CTRy), the selected candidate search vector (Dx, Dy), and the step size (S).

In this embodiment, the determining unit 12 defines said another one of the pixels in the reference image that serves as the target of search through a vector that is obtained as a result of a product of the selected candidate search vector (Dx, Dy) and the step size (S) and that originates from the center of search (CTRx, CTRy). Therefore, the target of search is defined as (CTRx+S·Dx, CTRy+S·Dy).

Figure 4:
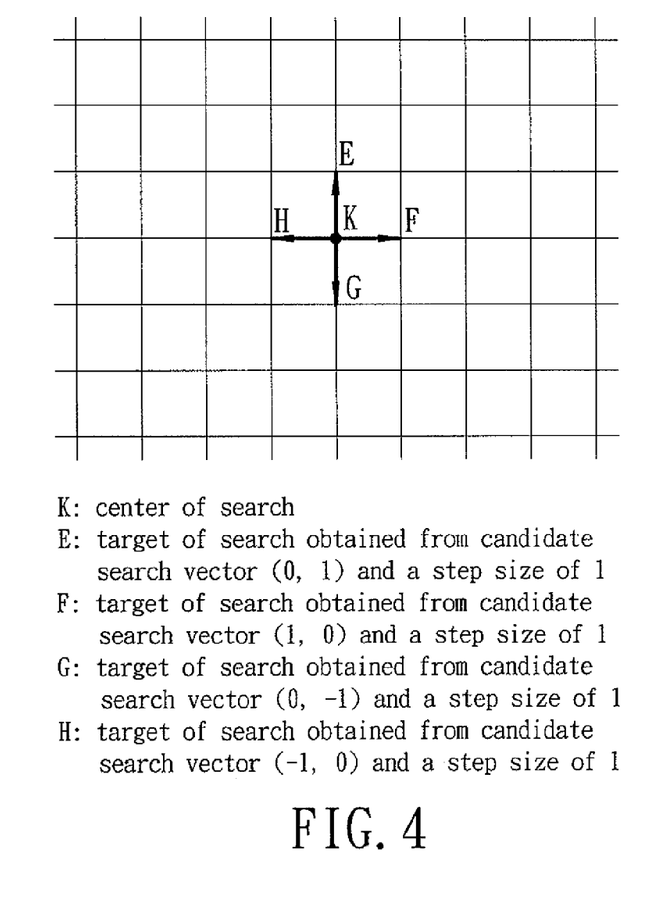
FIG. 4 is a schematic diagram, illustrating a center of search and targets of search when a step size is one according to the preferred embodiment.

In this embodiment, four possible targets of search can be obtained using the same step size (S), namely (CTRx+S·1, CTRy+S·0) (CTRx+S·(−1), CTRy+S·0), (CTRx+S·0, CTRy+S·1, (CTRx+S·0, CTRy+S·(−1). For example, with reference to FIG. 4, assuming that the center of search is located at point (K), when the step size (S) is equal to 1, the four possible targets of search would be located at points (E), (F), (G) and (H)

In step 85, the computing unit 13 determines the target error signal based on the target pixel set in the current image and one of the pixel sets in the reference image that includes the target of search. The computing unit 13 determines the target error signal with reference to computed differences between the pixels in the target pixel set in the current image and corresponding pixels in one of the pixel sets in the reference image that includes the target of search. Since the target error signal is determined in the same manner as with the center error signal in step 82, further details of the same are omitted herein for the sake of brevity.

In step 86, the determining unit 12 determines whether or not to update the center of search (CTRx, CTRy) and the center error signal based on a comparison result between the center error signal and the target error signal. In particular, the determining unit 12 determines whether the target error signal is smaller than the center error signal. In the negative, the flow goes to step 87; otherwise, the flow jumps to step 88.

In step 87, if it is determined in step 86 that the target error signal is not smaller than the center error signal, the center of search (CTRx, CTRy) and the center error signal are not updated by the determining unit 12. In addition, the set of candidate search vectors (Dx, Dy) available for selection with the same step size (S) used to define the target of search is updated by removing the selected candidate search vector (Dx, Dy) from the set.

The reasoning behind step 87 is that when the target error signal is not smaller than the center error signal, the difference between the target pixel set in the current image and the pixel sets in the reference image is likely to increase from the pixel set that includes the target of search in the direction of the selected candidate search vector (Dx, Dy). In other words, the current target of search is less likely the most probable source of estimation than the current center of search (CTRx, CTRy).

In step 88, if it is determined in step 86 that the center of search (CTRx, CTRy) and the center error signal are to be updated, the determining unit 12 updates the center of search (CTRx, CTRy) and the center error signal.

In particular, when the target error signal is smaller than the center error signal, the determining unit 12 updates the center of search (CTRx, CTRy) using the target of search, updates the center error signal using the target error signal, and updates the set of candidate search vectors (Dx, Dy) available for selection with the same step size (S) used to define the target of search by removing one of the candidate search vectors (Dx, Dy) that is opposite to the selected candidate search vector (Dx, Dy) selected in step 84 from the set.

For example, if the selected candidate search vector (Dx, Dy) is (1,0), then instep 88, the candidate search vector (−1, 0) is removed from the set of candidate search vectors available for selection with the same step size (S) used to define the target of search.

The reasoning behind step 88 is that when the target error signal is smaller than the center error signal, the difference between the target pixel set in the current image and the pixel sets in the reference image is likely to decrease from the pixel set that includes the center of search in the direction of the selected candidate search vector (Dx, Dy). In other words, it is less likely to locate the most probable source of estimation in the direction of the candidate search vector (Dx, Dy) that is opposite to the selected candidate search vector (Dx, Dy). This speeds up the process of searching for the most probable source of estimation.

Instep 89, the determining unit 12 determines whether there is at least one candidate search vector (Dx, Dy) available for selection for the same step size (S) in the set.

If it is determined in step 89 that there is at least one of the candidate search vectors (Dx, Dy) available for selection in the set, the process goes back to step 84 to select one of the candidate search vectors (Dx, Dy) from the set, which might possibly be the same as the previous selected candidate search vector (Dx, Dy) and steps 85~89 are repeated with the same step size (S).

If it is determined in step 89 that there is no candidate search vector (Dx, Dy) available for selection in the set, then the pixel set in the reference image that includes the current center of search (CTRx, CTRy) is currently the most probable source of estimation, and the process goes to step 90.

In step 90, under the control of the determining unit 12, the step size controller 11 determines whether or not the step size (S) has reached the predetermined value, which is "1" in this embodiment.

If it is determined in step 90 that the step size (S) has not yet reached the predetermined value, then the process goes to step 91, where the step size controller 11 generates a smaller step size (S), and steps 83~90 are subsequently repeated using the smaller step size (S).

By generating the smaller step size (S), the step size controller 11 increases the precision of the estimation. The step size controller 11 may generate the smaller step size (S) by dividing the previous step size (S) by two, or the smaller step size (S) may be generated in accordance with the difference between the target error signal and the center error signal. In the latter case, since a smaller difference denotes that the target of search and the center of search (CTRx, CTRy) are more similar to each other, and that the center of search is close to the most probable source of estimation, a reduction in the step size (S) determined by the step size controller 11 is made larger. In other words, in the latter case, the reduction in the step size (S) is inversely proportional to the difference between the center error signal and the target error signal. It should be noted herein that the former approach is a more common practice, i.e., to reduce the step size (S) by half.

If it is determined in step 90 that the step size (S) reaches the predetermined value, then the flow goes to step 92, where the determining unit 12 decides that the pixel set in the reference image that includes the most up-to-date center of search (CTRx, CTRy) is the most probable source of estimation, and computes a motion vector based on the target pixel set in the current image and one of the pixel sets in the reference image that includes the center of search (CTRx, CTRy). The motion vector is subsequently supplied to the motion compensator 2 and the entropy encoder 7.

In the example previously presented, assuming that the pixel (P, Q) is (32, 66), and the most up-to-date center of search (CTRx, CTRy) is (28, 72), then the motion vector is computed as (32−28, 66−72)=(4, −6).

It should be noted herein that although in this embodiment, there are four candidate search vectors (Dx, Dy) in total, namely (1, 0), (−1, 0), (0, 1), (0, −1), other numbers of candidate search vectors (Dx, Dy) may be used by the determining unit 12 in other embodiments of the present invention. For example, (±1, 0), (0, ±1), (±1, ±1).

Further, it should be noted herein that the search range diminishes with a rate that depends on the selection sequence of the candidate search vectors (Dx, Dy). To be clear, if the first target of search resulting from the first selected candidate search vector (Dx, Dy) is very close to the most probable source of estimation as determined in step 92, then the chance of the flow going from step 89 back to step 84 is greatly reduced, thereby reducing the chances of the computing unit 13 repeating step 85 and the determining unit 12 repeating step 86.

In sum, the motion estimator 1 of the present invention utilizes the determining unit 12 to determine, one by one, the possibilities of the pixel sets that include the targets of search obtained from the candidate search vectors (Dx, Dy) as being the most probable source of estimation, and updates the set of candidate search vectors (Dx, Dy) available for selection with the same step size (S) by removing the candidate search vector (Dx, Dy) that is opposite to the selected candidate search vector (Dx, Dy) from the set when the target of search obtained from the selected candidate search vector results in a target error signal that is smaller than the center error signal. Therefore, not every one of the candidate search vectors (Dx, Dy) is necessarily selected for the same step size (S) in the motion estimation method of the present invention, thereby reducing computation time required for and cost incurred by generating the motion vector for the target pixel set in the current image.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A motion estimation method for analyzing motion of a target pixel set in a current image with respect to a reference image, each of the current image and the reference image including a plurality of pixel sets, the target pixel set being one of the plurality of pixel sets in the current image, each of the pixel sets including at least one pixel, the motion estimation method comprising the machine-implemented steps of:

(A) defining one of the pixels in one of the pixel sets in the reference image as a center of search corresponding to the target pixel set;
   (B) determining a center error signal based on the target pixel set in the current image and said one of the pixel sets in the reference image that includes the center of search defined in step (A);
   (C) defining another one of the pixels in the reference image as a target of search with reference to the center of search, a candidate search vector selected from a set of candidate search vectors available for selection, and a step size;
   (D) determining a target error signal based on the target pixel set in the current image and one of the pixel sets in the reference image that includes the target of search;
   (E) determining whether or not to update the center of search and the center error signal based on a comparison result between the center error signal and the target error signal;
   (F) when it is determined in step (E) that the center of search and the center error signal are to be updated, updating the center of search and the center error signal, and updating the set of candidate search vectors available for selection with the step size used in step (C) by removing one of the candidate search vectors that is opposite to the selected candidate search vector from the set if said one of the candidate search vectors that is opposite to the selected candidate search vector is present in the set;
   (G) repeating steps (C) to (F) by selecting one of the candidate search vectors available for selection from the set and the same step size until there is no candidate search vector available for selection in the set;
   (H) repeating steps (C) to (G) using a smaller step size until the value of the step size reaches a predetermined value; and
   (I) computing a motion vector based on the target pixel set in the current image and one of the pixel sets in the reference image that includes the center of search.

2. The motion estimation method as claimed in claim 1, wherein, in step (B), the center error signal is determined with reference to computed differences between the pixels in the target pixel set in the current image and corresponding pixels in said one of the pixel sets in the reference image that includes the center of search.

3. The motion estimation method as claimed in claim 1, wherein, in step (D), the target error signal is determined with reference to computed differences between the pixels in the target pixel set in the current image and corresponding pixels in one of the pixel sets in the reference image that includes the target of search.

4. The motion estimation method as claimed in claim 1, wherein, in step (C), an initial value of the step size is determined based on a total number of the pixels in the reference image.

5. The motion estimation method as claimed in claim 1, wherein, in step (H), a reduction in the step size is inversely proportional to a difference between the center error signal and the target error signal.

6. The motion estimation method as claimed in claim 1, wherein, in step (H), the smaller step size is half of a previous step size.

7. The motion estimation method as claimed in claim 1, wherein, in step (H), the predetermined value is 1.

8. The motion estimation method as claimed in claim 1, wherein, in step (C), said another one of the pixels in the reference image that serves as the target of search is defined by a vector that is obtained as a result of a product of the selected candidate search vector and the step size and that originates from the center of search.

9. The motion estimation method as claimed in claim 1, wherein:

in step (E), when the target error signal is not smaller than the center error signal, the center of search and the center error signal are not updated, and the set of candidate search vectors available for selection with the step size used in step (C) is updated by removing the selected candidate search vector from the set; and
   in step (F), when the target error signal is smaller than the center error signal, the target of search is used to update the center of search, and the target error signal is used to update the center error signal.

10. A motion estimator for analyzing motion of a target pixel set in a current image with respect to a reference image, each of the current image and the reference image including a plurality of pixel sets, the target pixel set being one of the plurality of pixel sets in the current image, each of the pixel sets including at least one pixel, said motion estimator comprising:

a step size controller for providing a step size;
   a determining unit coupled electrically to said step size controller for receiving the step size therefrom, defining one of the pixels in one of the pixel sets in the reference image as a center of search corresponding to the target pixel set, selecting a candidate search vector from a set of candidate search vectors available for selection, and further defining another one of the pixels in the reference image as a target of search with reference to the center of search, the selected candidate search vector, and the step size received from said step size controller; and a computing unit coupled electrically to said determining unit for receiving the center of search and the target of search therefrom, determining a center error signal based on the target pixel set in the current image and said one of the pixel sets in the reference image that includes the center of search, further determining a target error signal based on the target pixel set in the current image and one of the pixel sets in the reference image that includes the target of search, and transmitting the center error signal and the target error signal to said determining unit;

wherein said determining unit determines whether or not to update the center of search and the center error signal based on a comparison result between the center error signal and the target error signal, and updates the center of search and the center error signal and further updates the set of candidate search vectors available for selection with the same step size by removing one of the candidate search vectors that is opposite to the selected candidate search vector from the set when it is determined that the center of search and the center error signal are to be updated and that said one of the candidate search vectors that is opposite to the selected candidate search vector is present in the set;

said determining unit and said computing unit being operable to repeatedly select one of the candidate search vectors available for selection from the set, define another one of the pixels in the reference image as the target of search, determine the target error signal, determine whether or not to update the center of search and the center error signal, and update the center of search and the center error signal when it is determined that the center of search and the center error signal are to be updated until there is no candidate search vector available for selection in the set;

said step size controller, said determining unit and said computing unit being operable to repeatedly provide a smaller step size, select one of the candidate search vectors available for selection, define another one of the pixels in the reference image as the target of search, determine the target error signal, determine whether or not to update the center of search and the center error signal, and update the center of search and the center error signal when it is determined that the center of search and the center error signal are to be updated until the value of the step size reaches a predetermined value;

said determining unit computing a motion vector based on the target pixel set in the current image and one of the pixel sets in the reference image that includes the center of search when the value of the step size reaches the predetermined value.

11. The motion estimator as claimed in claim 10, wherein said computing unit determines the center error signal with reference to computed differences between the pixels in the target pixel set in the current image and corresponding pixels in said one of the pixel sets in the reference image that includes the center of search.

12. The motion estimator as claimed in claim 10, wherein said computing unit determines the target error signal with reference to computed differences between the pixels in the target pixel set in the current image and corresponding pixels in one of the pixel sets in the reference image that includes the target of search.

13. The motion estimator as claimed in claim 10, wherein said step size controller determines an initial value of the step size based on a total number of the pixels in the reference image.

14. The motion estimator as claimed in claim 10, wherein a reduction in the step size determined by said step size controller is inversely proportional to a difference between the center error signal and the target error signal.

15. The motion estimator as claimed in claim 10, wherein the smaller step size is half of a previous step size.

16. The motion estimator as claimed in claim 10, wherein the predetermined value is 1.

17. The motion estimator as claimed in claim 10, wherein said determining unit defines said another one of the pixels in the reference image that serves as the target of search through a vector that is obtained as a result of a product of the selected candidate search vector and the step size and that originates from the center of search.

18. The motion estimator as claimed in claim 10, wherein:
when the target error signal is not smaller than the center error signal, the center of search and the center error signal are not updated by said determining unit, and the set of candidate search vectors available for selection with the same step size is updated by removing the selected candidate search vector used to define the target of search from the set; and
when the target error signal is smaller than the center error signal, said determining unit updates the center of search using the target of search, and updates the center error signal using the target error signal.

* * * * *